(12) United States Patent
Zhou et al.

(10) Patent No.: US 9,891,461 B2
(45) Date of Patent: Feb. 13, 2018

(54) DISPLAY PANEL, MANUFACTURING METHOD THEREOF AND DISPLAY DEVICE

(71) Applicant: BOE TECHNOLOGY GROUP CO., LTD., Beijing (CN)

(72) Inventors: Haifeng Zhou, Beijing (CN); Zhuo Zhang, Beijing (CN); Xuelan Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 69 days.

(21) Appl. No.: 14/555,830

(22) Filed: Nov. 28, 2014

(65) Prior Publication Data

US 2015/0378239 A1    Dec. 31, 2015

(30) Foreign Application Priority Data

Jun. 27, 2014    (CN) .......................... 2014 1 0302667

(51) Int. Cl.
*G02B 26/02*    (2006.01)
*G02F 1/1335*    (2006.01)
*G02B 26/00*    (2006.01)

(52) U.S. Cl.
CPC ..... *G02F 1/133514* (2013.01); *G02B 26/004* (2013.01); *G02B 26/005* (2013.01); *G02F 2201/44* (2013.01)

(58) Field of Classification Search
CPC ... G02B 26/004; G02B 26/005; G02F 1/0009; G02F 1/0018; G02F 1/0081; G02F 1/00;

(Continued)

(56) References Cited

U.S. PATENT DOCUMENTS

2007/0188676 A1    8/2007  Choi et al.
2011/0286073 A1*  11/2011  Lo ........................ G02B 26/005
                                                        359/290

(Continued)

FOREIGN PATENT DOCUMENTS

CN    102692703 A    9/2012
CN    102707432 A    10/2012

(Continued)

OTHER PUBLICATIONS

1st office action issued in corresponding Chinese application No. 201410302667.7 dated May 25, 2016.

*Primary Examiner* — Marin Pichler
(74) *Attorney, Agent, or Firm* — Nath, Goldberg & Meyer; Joshua B. Goldberg; Annie J. Kock (57) ABSTRACT

The present invention provides a display panel, a manufacturing method thereof, and a display device. The display panel comprises a base substrate, an opposite substrate, a first electrode, a second electrode, and a plurality of original sub-pixels on at least part of which conversion sub-pixels are provided, and an upper water layer is provided on each of the conversion sub-pixels. The conversion sub-pixel is configured to, when an electric field is generated between the first and second electrodes, shrink to one side of the original sub-pixel so that the upper water layer covers the original sub-pixel from above, and, when no electric field is generated between the first and second electrodes, cover the original sub-pixel located under the conversion sub-pixel from above.

10 Claims, 4 Drawing Sheets (58) Field of Classification Search
CPC ...... G02F 1/073; G02F 1/01; G02F 1/133514; G02F 1/13; G02F 2201/44
USPC .................................................. 359/252, 523
See application file for complete search history.

(56) References Cited

U.S. PATENT DOCUMENTS

2012/0307330 A1* 12/2012 Tian ..................... G02B 26/005
359/228
2013/0141775 A1* 6/2013 Yao ......................... B32B 37/14
359/290

FOREIGN PATENT DOCUMENTS

| CN | 102914868 A | 2/2013 |
| CN | 102981267 A | 3/2013 |

\* cited by examiner

DISPLAY PANEL, MANUFACTURING METHOD THEREOF AND DISPLAY DEVICE

FIELD OF THE INVENTION

The present invention relates to the field of display technology, and particularly to a display panel, a manufacturing method thereof and a display device.

BACKGROUND OF THE INVENTION

A conventional liquid crystal display (simply referred to as LCD) comprises a backlight module and a liquid crystal display panel. The backlight module is used for emitting, from a back side of the liquid display panel to a front side of the same, white light which can be captured by human eyes after passing through the liquid crystal display panel. The liquid crystal display panel comprises an array substrate and a color filter substrate on which a color filter (colorama group pattern) of a corresponding color is provided at each sub-pixel. After passing through the color filter, the white light is turned into light with corresponding color. Thus, a display function can be achieved by controlling light penetration amount at respective sub-pixels.

In a conventional liquid crystal display, a single pixel is composed of a red (R) sub-pixel, a green (G) sub-pixel and a blue (B) sub-pixel. Since these three sub-pixels are too close to be separated by human eyes, they are regarded as one mixed point. Red, green, and blue are three primary colors of light, and any desired light may be generated by mixing the red light, green light and blue light with different brightness emitted from the red, green and blue sub-pixels, respectively.

With the continuous development of science and technology, there are even higher demand on display of color pictures. As for a conventional color display technology, power consumption of the liquid crystal display is large due to low utilization of a light source, and color gamut is small, which cannot meet requirements of different circumstances.

SUMMARY OF THE INVENTION

In order to solve the above problems, the present invention provides a display panel, a manufacturing method thereof and a display device used for solving the problems of low utilization of a light source and narrow color gamut in the color display technology of the prior art.

For this purpose, an embodiment of the present invention provides a display panel comprising a base substrate and an opposite substrate which are provided oppositely, wherein a first electrode is provided on the base substrate, a second electrode, which is opposite to the first electrode, is provided on the opposite substrate; between the first and second electrodes, there are provided: a plurality of original sub-pixels, on at least part of which conversion sub-pixels are provided, and an upper water layer is provided on each of the conversion sub-pixels;

the conversion sub-pixel is configured to, when an electric field is generated between the first and second electrodes, shrink to one side of the original sub-pixel so that the upper water layer covers the original sub-pixel from above, and, when no electric field is generated between the first and second electrodes, cover the original sub-pixel located under the conversion sub-pixel from above; or the conversion sub-pixel is configured to, when no electric field is generated between the first and second electrodes, shrink to one side of the original sub-pixel so that the upper water layer covers the original sub-pixel from above, and when an electric field is generated between the first and second electrodes, cover original sub-pixel located under the conversion sub-pixel from above.

Optionally, a material of the original sub-pixel includes an amphipathic material, when an electric field is generated between the first and second electrodes, the original sub-pixel is hydrophilic under the action of the electric field, and when no electric field is generated between the first and second electrodes, the original sub-pixel is hydrophobic; or, when an electric field is generated between the first and second electrodes, the original sub-pixel is hydrophobic under the action of the electric field, and when no electric field is generated between the first and second electrodes, the original sub-pixel is hydrophilic.

Optionally, an amphipathic material layer is provided between the original sub-pixel and the conversion sub-pixel; when an electric field is generated between the first and second electrodes, the amphipathic material layer is hydrophilic under the action of the electric field, and when no electric field is generated between the first and second electrodes, the amphipathic material layer is hydrophobic; or, when an electric field is generated between the first and second electrodes, the amphipathic material layer is hydrophobic under the action of the electric field, and when no electric field is generated between the first and second electrodes, the amphipathic material layer is hydrophilic.

Optionally, the display panel further comprises baffles surrounding the conversion sub-pixels and the upper water layers and used for defining the conversion sub-pixel and the upper water layer to be positioned above the original sub-pixel which is under the conversion sub-pixel.

Optionally, the display panel further comprises a black matrix, and each of the baffles is provided above the black matrix around the original sub-pixel which is under the conversion sub-pixel.

Optionally, the original sub-pixels which are under the conversion sub-pixels are white sub-pixels, and the conversion sub-pixels are yellow ink layers.

Another embodiment of the present invention provides a display device comprising the above-described display panel.

Another embodiment of the present invention provides a manufacturing method of a display panel, comprising steps of:

forming a first electrode on a base substrate;

forming a plurality of original sub-pixels on the first electrode;

forming conversion sub-pixels on at least part of the original sub-pixels;

forming an upper water layer on each of the conversion sub-pixels;

forming a second electrode on an opposite substrate; and aligning the resulting base substrate and opposite substrate to form a cell so as to form the display panel, wherein, the conversion sub-pixel is configured to, when an electric field is generated between the first and second electrodes, shrink to one side of the original sub-pixel so that the upper water layer covers the original sub-pixel from above, and, when no electric field is generated between the first and second electrodes, cover the original sub-pixel located under the conversion sub-pixel from above; or the conversion sub-pixel is configured to, when no electric field is generated between the first and second electrodes, shrink to one side of the original sub-pixel so that the upper water layer covers the original sub-pixel from above, and, when an electric field is generated between the first and second electrodes, cover the original sub-pixel located under the conversion sub-pixel from above.

Optionally, before the step of forming the conversion sub-pixels on at least part of the original sub-pixels, the manufacturing method comprises a step of forming amphipathic material layers on at least part of the original sub-pixels, wherein when an electric field is generated between the first and second electrodes, the amphipathic material layers are hydrophilic under the action of the electric field, and when no electric field is generated between the first and second electrodes, the amphipathic material layers are hydrophobic; or, when an electric field is generated between the first and second electrodes, the amphipathic material layers are hydrophobic under the action of the electric field, and when no electric field is generated between the first and second electrodes, the amphipathic material layers are hydrophilic; and, the step of forming conversion sub-pixels on at least part of the original sub-pixels comprises a step of forming the conversion sub-pixels on the amphipathic material layers.

Optionally, before the step of forming the conversion sub-pixels on at least part of the original sub-pixels, the manufacturing method comprises a step of forming baffles surrounding the conversion sub-pixels and the upper water layers and used for defining the conversion sub-pixel and the upper water layer to be positioned above the original sub-pixel which is under the conversion sub-pixel.

Optionally before the step of forming the baffles surrounding the conversion sub-pixels and the upper water layers, the manufacturing method comprises a step of forming a black matrix on the first electrode, and each of the baffles is provided above the black matrix around the original sub-pixel which is under the conversion sub-pixel.

The embodiments of the present invention possess the following beneficial effects:

in the display panel, manufacturing method thereof and display device provided by the embodiments of the present invention, based on the presence or absence of electric field between the first electrode and the second electrode, the display panel switches between a conversion sub-pixel mode and an original sub-pixel mode. That is, the display panel can display in different modes (e.g. with different colors), and thus it is possible to improve utilization of a light source, reduce power consumption of the display panel, widen color gamut of color display, and further meet requirements of different circumstances on color picture display.

DETAILED DESCRIPTION OF THE EMBODIMENTS

In order to make a person skilled in the art better understand the technical solutions of the present invention, a display panel and a manufacturing method thereof provided by the present invention will be described in detail below in conjunction with the accompanying drawings.

Embodiment 1

Figure 1:
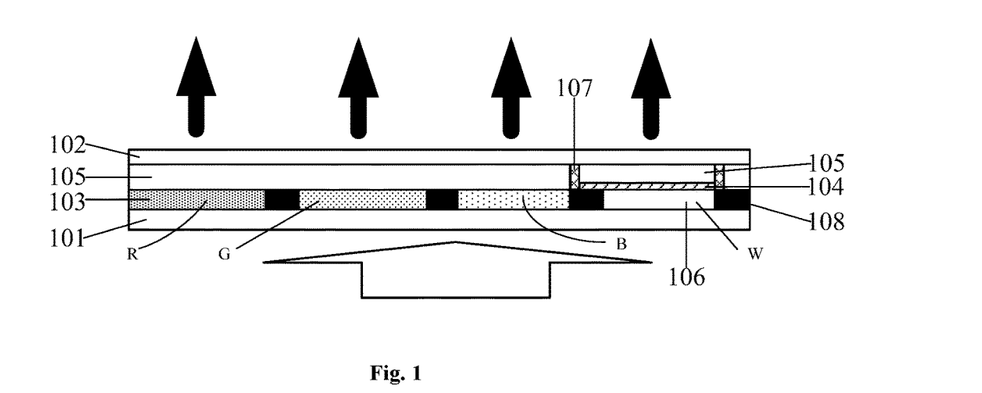
FIG. 1 is a schematic diagram of a structure of a display panel provided by embodiment 1 of the present invention when no voltage is applied.
Figure 2:
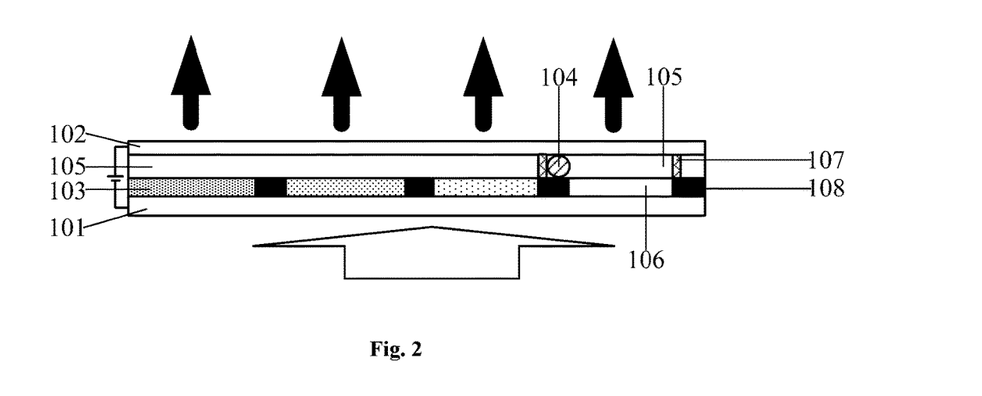
FIG. 2 is a schematic diagram of a structure of the display panel shown in FIG. 1 when a voltage is applied.

FIG. 1 is a schematic diagram of a structure of a display panel provided by embodiment 1 of the present invention when no voltage is applied, and FIG. 2 is a schematic diagram of a structure of the display panel shown in FIG. 1 when a voltage is applied. As shown in FIGS. 1 and 2, the display panel comprises a base substrate and an opposite substrate (substrates are not shown in figures) arranged opposite to each other, a first electrode 101 provided on the base substrate and a second electrode 102 provided on the opposite substrate and being opposite to the first electrode 101. The display panel further comprises a plurality of original sub-pixels 103. The first electrode 101 (and the second electrode 102) corresponds to the whole area or partial area of the display panel. Correspondingly, all of or part of the original sub-pixels 103 are arranged between the first electrode 101 and the second electrode 102. Conversion sub-pixels 104 are provided on at least part of the original sub-pixels 106 among the original sub-pixels arranged between the first electrode 101 and the second electrode 102. An upper water layer 105 is provided on each of the conversion sub-pixels 104.

In this embodiment, based on presence or absence of electric field between the first electrode 101 and the second electrode 102, the display panel can switch between a conversion sub-pixel mode and an original sub-pixel mode. Referring to FIG. 1, no voltage is applied between the first electrode 101 and the second electrode 102, and thus no electric field is generated between the first electrode 101 and the second electrode 102. At this point, the conversion sub-pixel 104 covers the original sub-pixel 106 which is under the conversion sub-pixel 104 from above, and the display mode of the display panel becomes the conversion sub-pixel mode which is the normal state for the display panel. In such conversion sub-pixel mode, when light passes through both the original sub-pixels 106 and the conversion sub-pixels 104 along a direction shown by the arrow in FIG. 1, desired light can be generated under the joint action of the original sub-pixels 106 and the conversion sub-pixels 104.

Referring to FIG. 2, a voltage is applied between the first electrode 101 and the second electrode 102, and thus an electric field is generated between the first electrode 101 and the second electrode 102. At this point, each of the conversion sub-pixels 104 shrinks to one side of the original sub-pixel 106 so that the upper water layer 105 covers the original sub-pixel 106 from above, and the display mode of the display panel becomes the original sub-pixel mode. In such original sub-pixel mode, when light passes through only the original sub-pixels 106, without passing through the conversion sub-pixels 104, along a direction shown by the arrow in FIG. 2, desired light can be generated. By switching between the above two display modes, whether light passes through the conversion sub-pixels 104 or not can be controlled, which may change state of light. In this way, it is possible to improve utilization of a light source for the display panel, reduce power consumption of the display panel, widen color gamut of color display, and further meet requirements of different circumstances on color picture display.

It should be noted that the base substrate provided with the first electrode structure may be a color filter substrate in a liquid crystal panel, and correspondingly, the opposite substrate provided with the second electrode structure may be an array substrate in the liquid crystal panel, or the opposite substrate may be a separately added substrate (e.g., a substrate on an outer side of the color filter substrate); optionally, the base substrate provided with the first electrode structure may be a backplane in an OLED panel, and correspondingly, the opposite substrate provided with the second electrode structure may be a cover plate in the OLED panel; optionally, the base substrate provided with the first electrode structure may be a backplane in a flexible display panel, and correspondingly, the opposite substrate provided with the second electrode structure may be a package substrate in the flexible display panel. The above is described only for the purpose of schematic explanation, rather than limiting the present invention.

Optionally, a material for the original sub-pixels 106 includes a transparent, colorless and amphipathic material. When no electric field is generated between the first electrode 101 and second electrode 102, each of the original sub-pixels 106 is hydrophobic without the action of the electric field, which results in that the upper water layer 105 is pushed out, the conversion sub-pixel 104 covers the original sub-pixels 106 from above, and the display mode of the display panel becomes the conversion sub-pixel mode. When an electric field is generated between the first electrode 101 and second electrode 102, each of the original sub-pixels 106 becomes hydrophilic under the action of the electric field, which results in that the upper water layer 105 is drawn closer, the conversion sub-pixel 104 is pushed aside and shrink to one side of the original sub-pixel 106, so that the upper water layer 105 covers the original sub-pixel 106 from above, and the display mode of the display panel becomes the original sub-pixel mode. Optionally, the amphipathic material includes an amphipathic polyurethane material or an amphipathic silica nanomaterial.

It should be understood that, the correspondence between "presence or absence of electric field" and "status of conversion sub-pixel 104 (whether it shrinks or not)" is not unique, but vice versa. That is, FIG. 1 can also represent a case that a voltage is applied between the first electrode 101 and the second electrode 102, and in this case, an electric field is generated between the first electrode 101 and the second electrode 102, and the conversion sub-pixel 104 covers the original sub-pixel 106 which is under the conversion sub-pixel 104 from above; correspondingly, FIG. 2 can also represent a case that no voltage is applied between the first electrode 101 and the second electrode 102, and in this case, no electric field is generated between the first electrode 101 and the second electrode 102, and the conversion sub-pixel 104 shrinks to one side of the original sub-pixel 106 so that the upper water layer 105 covers the original sub-pixel 106 from above.

When the correspondence between "presence or absence of electric field" and "status of conversion sub-pixel 104 (whether it shrinks or not)" changes, property of the amphipathic material should change correspondingly. That is, when no electric field is generated between the first electrode 101 and second electrode 102, the original sub-pixels 106 are hydrophilic, and when an electric field is generated between the first electrode 101 and second electrode 102, the original sub-pixels 106 become hydrophobic.

For simplicity, in the following description, the former correspondence is taken as an example.

Optionally, the display panel further comprises baffles 107, and as shown in FIGS. 1 and 2, the baffles 107 are provided to surround the conversion sub-pixels 104 and the upper water layers 105. The baffles 107 are used for defining the conversion sub-pixel 104 and the upper water layer 105 to be positioned above the original sub-pixel 106 which is under the conversion sub-pixel 104.

Optionally, the display panel further comprises a black matrix 108, and as shown in FIGS. 1 and 2, each of the baffles 107 is provided above the black matrix 108 around the original sub-pixel 106 which is under the conversion sub-pixel 104 so as to surround the conversion sub-pixel 104 and the upper water layer 105.

Optionally, the original sub-pixels 106 are white sub-pixels, and the conversion sub-pixels 104 are yellow ink layers. Referring to FIG. 1, when no voltage is applied between the first electrode 101 and the second electrode 102, each of the white sub-pixels is hydrophobic and each yellow ink layer covers the white sub-pixel from above. At this point, when light passes through both the yellow ink layer and the white sub-pixel along a direction shown by the arrow in FIG. 1, yellow light can be generated. Referring to FIG. 2, when a voltage is applied between the first electrode 101 and the second electrode 102, each of the white sub-pixels becomes hydrophilic, and each yellow ink layer shrinks to one side of the white sub-pixel so that the upper water layer 105 covers the white sub-pixel from above. At this point, when light passes through only the white sub-pixel along a direction shown by the arrow in FIG. 2, white light can be generated.

In the display panel provided by this embodiment, the display panel switches between the conversion sub-pixel mode and the original sub-pixel mode (i.e., between RGBW mode and RGBY mode) based on presence or absence of electric field between the first electrode and the second electrode, so that different modes may be used under different circumstances, thereby improving utilization of a light source for the display panel, reducing power consumption of the display panel, widening color gamut of color display, and further meeting requirements of different circumstances on color picture display.

It is obvious that the white sub-pixel and the yellow ink layer are not the only examples of the original sub-pixel and the conversion sub-pixel, and other examples may be feasible as long as it is ensured that display effect obtained when light passes through the conversion sub-pixels is different from that obtained when light does not pass through the conversion sub-pixels.

Embodiment 2

Figure 3:
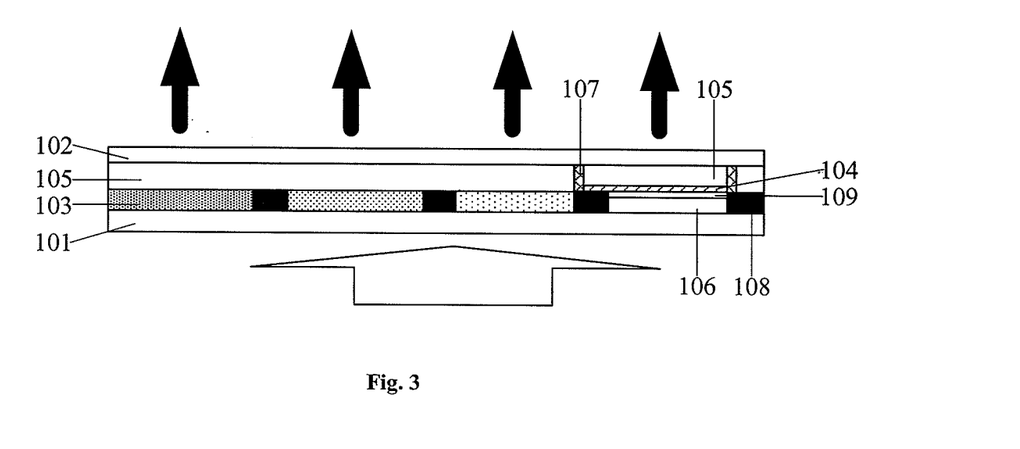
FIG. 3 is a schematic diagram of a structure of a display panel provided by embodiment 2 of the present invention when no voltage is applied.
Figure 4:
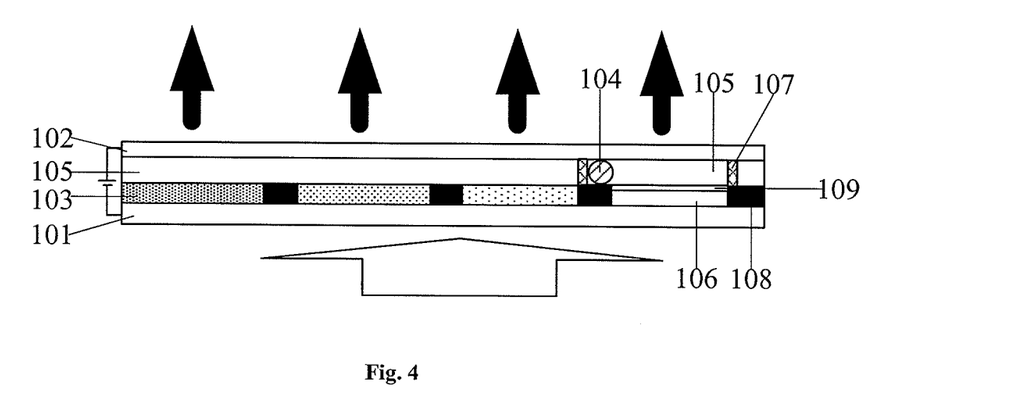
FIG. 4 is a schematic diagram of a structure of the display panel shown in FIG. 3 when a voltage is applied.

FIG. 3 is a schematic diagram of a structure of a display panel provided by embodiment 2 of the present invention when no voltage is applied, and FIG. 4 is a schematic diagram of a structure of the display panel shown in FIG. 3 when a voltage is applied. As shown in FIGS. 3 and 4, the display panel comprises a base substrate and an opposite substrate (substrates are not shown in figures) arranged opposite to each other, a first electrode 101 provided on the base substrate and a second electrode 102 provided on the opposite substrate and being opposite to the first electrode 101. The display panel further comprises a plurality of original sub-pixels 103. At least part of the original sub-pixels 103 are arranged between the first electrode 101 and the second electrode 102, and conversion sub-pixels 104 are provided on at least part of the original sub-pixels 106. An upper water layer 105 is provided on each of the conversion sub-pixels 104.

In this embodiment, based on presence or absence of electric field between the first electrode 101 and the second electrode 102, the display panel can switch between a conversion sub-pixel mode and an original sub-pixel mode. Referring to FIG. 3, no voltage is applied between the first electrode 101 and the second electrode 102, and thus no electric field is generated between the first electrode 101 and the second electrode 102. At this point, the conversion sub-pixel 104 covers the original sub-pixel 106 which is under the conversion sub-pixel 104 from above, and the display mode of the display panel becomes the conversion sub-pixel mode which is the normal state for the display panel. In such conversion sub-pixel mode, when light passes through both the original sub-pixels 106 and the conversion sub-pixels 104 along a direction shown by the arrow in FIG. 3, desired light can be generated under the joint action of the original sub-pixels 106 and the conversion sub-pixels 104.

Referring to FIG. 4, a voltage is applied between the first electrode 101 and the second electrode 102, and thus an electric field is generated between the first electrode 101 and the second electrode 102. At this point, each of the conversion sub-pixels 104 shrinks to one side of the original sub-pixel 106 so that the upper water layer 105 covers the original sub-pixel 106 from above, and the display mode of the display panel becomes the original sub-pixel mode. In such original sub-pixel mode, when light passes through only the original sub-pixels 106, without passing through the conversion sub-pixels 104, along a direction shown by the arrow in FIG. 4, desired light can be generated. By switching between the above two display modes, whether light passes through the conversion sub-pixels 104 or not can be controlled, which may change state of light. In this way, it is possible to improve utilization of a light source for the display panel, reduce power consumption of the display panel, widen color gamut of color display, and further meet requirements of different circumstances on color picture display.

Optionally, an amphipathic material layer 109 is provided between the original sub-pixel 106 and the conversion sub-pixel 104. When no electric field is generated between the first electrode 101 and second electrode 102, the amphipathic material layer 109 is hydrophobic without the action of the electric field, which results in that the conversion sub-pixels 104 covers the original sub-pixel 106 from above, and the display mode of the display panel becomes the conversion sub-pixel mode. When an electric field is generated between the first electrode 101 and second electrode 102, the amphipathic material layer 109 becomes hydrophilic, which results in that the conversion sub-pixel 104 shrink to one side of the original sub-pixel 106, so that the upper water layer 105 covers the original sub-pixels 106, and the display mode of the display panel is the original sub-pixel mode. Optionally, the amphipathic material includes an amphipathic polyurethane material or an amphipathic silica nanomaterial.

Optionally, the display panel further comprises baffles 107, and as shown in FIGS. 3 and 4, the baffles 107 surround the conversion sub-pixels 104 and the upper water layers 105. The baffles 107 are used for defining the conversion sub-pixel 104 and the upper water layer 105 to be positioned above the original sub-pixel 106 which is under the conversion sub-pixel 104. Preferably, the display panel further comprises a black matrix 108, and each of the baffles 107 is provided above the black matrix 108 around the original sub-pixel 106.

Optionally, the original sub-pixels 106 are white sub-pixels, and the conversion sub-pixels 104 are yellow ink layers. Referring to FIG. 3, when no voltage is applied between the first electrode 101 and the second electrode 102, the amphipathic material layer 109 becomes hydrophobic and each yellow ink layer covers the white sub-pixel from above. At this point, when light passes through both the yellow ink layer and the white sub-pixel along a direction shown by the arrow in FIG. 3, yellow light can be generated. Referring to FIG. 4, when a voltage is applied between the first electrode 101 and the second electrode 102, the amphipathic material layer 109 becomes hydrophilic, and the yellow ink layer shrinks to one side of the white sub-pixel so that the upper water layer 105 covers the white sub-pixel from above. At this point, when light passes through only the white sub-pixel along a direction shown by the arrow in FIG. 4, white light can be generated.

In the display panel provided by this embodiment, the display panel switches between the conversion sub-pixel mode and the original sub-pixel mode based on presence or absence of electric field between the first electrode and the second electrode, so that different modes may be used under different circumstances, thereby improving utilization of a light source for the display panel, reducing power consumption of the display panel, widening color gamut of color display, and further meeting requirements of different circumstances on color picture display.

Embodiment 3

Figure 5:
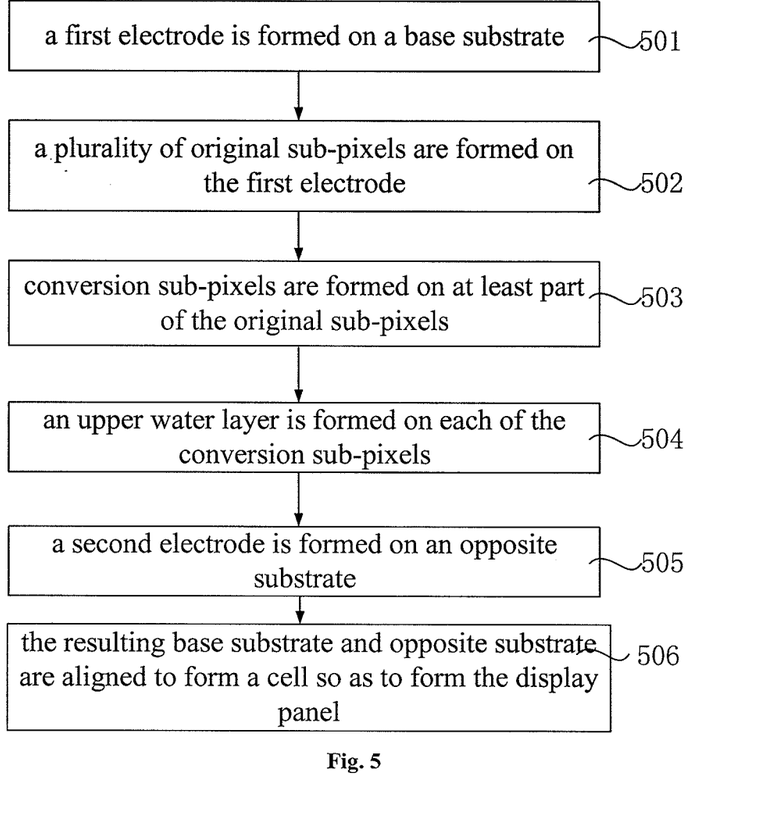
FIG. 5 is a flowchart of a manufacturing method of a display panel provided by embodiment 3 of the present invention.

FIG. 5 is a flowchart of a manufacturing method of a display panel provided by embodiment 3 of the present invention. As shown in FIG. 5, the manufacturing method of a display panel comprises steps 501 to 506.

At step 501, a first electrode is formed on a base substrate.

At this step, the first electrode may cover the entire base substrate, or cover only part of the base substrate.

At step 502, a plurality of original sub-pixels are formed on the first electrode.

When the first electrode covers only part of the base substrate, a plurality of original sub-pixels may also be formed at positions without the first electrode.

Optionally, the original sub-pixel comprises red (R) sub-pixel, green (G) sub-pixel, blue (B) sub-pixel and white (W) sub-pixel, as shown in FIG. 1. Sub-pixels of RGBW four colors are formed by adding a white sub-pixel to sub-pixels of original RGB three primary colors, which may improve utilization of a light source for the display panel, increase display brightness of the display panel, and reduce power consumption of the display panel.

Optionally, the original sub-pixel comprises red (R) sub-pixel, green (G) sub-pixel, blue (B) sub-pixel and yellow (Y) sub-pixel. Sub-pixels of RGBY four colors are formed by adding a yellow sub-pixel to sub-pixels of original RGB three primary colors. The addition of yellow sub-pixel changes shape of the color gamut map from the original triangle (composed of sub-pixels of original RGB three primary colors) into quadrangle (composed of sub-pixels of RGBY four colors) and significantly widen color gamut of color display.

At step 503, conversion sub-pixels are formed on at least part of the original sub-pixels.

Here, before step 503, baffles may be firstly formed. The baffles surround the conversion sub-pixels and upper water layers to be formed later. The baffles define the conversion sub-pixels and the upper water layers to be positioned above the original pixels. Preferably, before forming the baffles, a black matrix is formed on the first electrode, and each baffle is provided above the black matrix around the original sub-pixels.

At step 504, an upper water layer is formed on each of the conversion sub-pixels.

At step 505, a second electrode is formed on an opposite substrate.

At step 506, the resulting base substrate and opposite substrate are aligned to form a cell so as to form the display panel.

The display panel manufactured by the manufacturing method provided by this embodiment can switch between the conversion sub-pixel mode and the original sub-pixel mode based on presence or absence of electric field between the first electrode 101 and the second electrode 102. Specifically, when no voltage is applied between the first electrode 101 and the second electrode 102, no electric field is generated between the first electrode 101 and the second electrode 102. At this point, the conversion sub-pixel 104 covers the original sub-pixel 106 from above, and the display mode of the display panel becomes the conversion sub-pixel mode which is the normal state for the display panel. In such conversion sub-pixel mode, when light passes through both the original sub-pixel 106 and the conversion sub-pixel 104, desired light can be generated under the joint action of the original sub-pixel 106 and the conversion sub-pixel 104. When a voltage is applied between the first electrode 101 and the second electrode 102, an electric field is generated between the first electrode 101 and the second electrode 102. At this point, the conversion sub-pixel 104 shrinks to one side of the original sub-pixel 106, so that the upper water layer 105 covers the original sub-pixels 106, and the display mode of the display panel becomes the original sub-pixel mode. In such original sub-pixel mode, when light passes through only the original sub-pixel 106, desired light can be generated. A material for the original sub-pixels 106 includes an amphipathic material. Optionally, the amphipathic material includes an amphipathic polyurethane material or an amphipathic silica nanomaterial. By switching between the above two display modes, it is possible to improve utilization of a light source for the display panel, reduce power consumption of the display panel, widen color gamut of color display, and further meet requirements of different circumstances on color picture display.

Optionally, the original sub-pixels 106 are white sub-pixels, and the conversion sub-pixels 104 are yellow ink layers. Referring to FIG. 1, when no voltage is applied between the first electrode 101 and the second electrode 102, each of the white sub-pixels is hydrophobic and each yellow ink layer covers the white sub-pixel from above. At this point, when light passes through both the yellow ink layer and the white sub-pixel along a direction shown by the arrow in FIG. 1, yellow light can be generated. Referring to FIG. 2, when a voltage is applied between the first electrode 101 and the second electrode 102, each of the white sub-pixels becomes hydrophilic, and each yellow ink layer shrinks to one side of the white sub-pixel, so that the upper water layer 105 covers the white sub-pixel from above. At this point, when light passes through only the white sub-pixel along a direction shown by the arrow in FIG. 2, white light can be generated.

In the manufacturing method of a display panel provided by this embodiment, based on presence or absence of electric field between the first electrode and the second electrode, the display panel switches between the conversion sub-pixel mode and the original sub-pixel mode, so as to improve utilization of a light source for the display panel, reduce power consumption of the display panel, widen color gamut of color display, and further meet requirements of different circumstances on color picture display.

Embodiment 4

Figure 6:
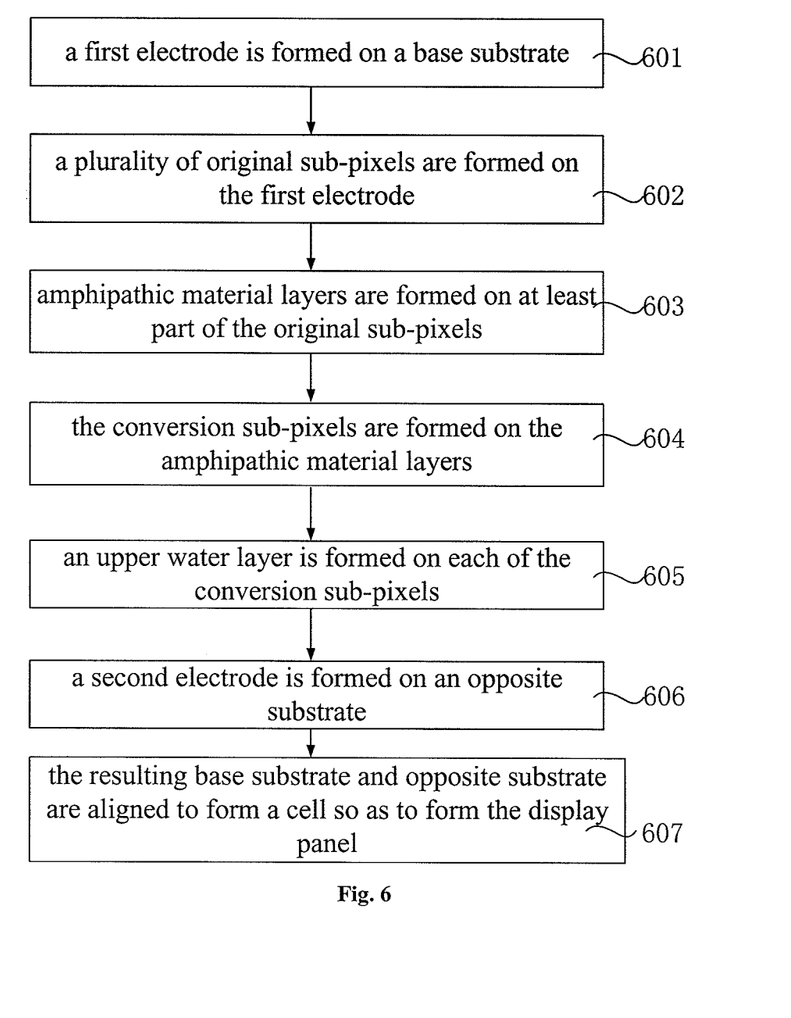
FIG. 6 is a flowchart of a manufacturing method of a display panel provided by embodiment 4 of the present invention.

FIG. 6 is a flowchart of a manufacturing method of a display panel provided by embodiment 4 of the present invention. As shown in FIG. 6, the manufacturing method of a display panel comprises steps 601 to 607.

At step 601, a first electrode is formed on a base substrate.

At this step, the first electrode may cover the entire base substrate, or cover only part of the base substrate.

At step 602, a plurality of original sub-pixels are formed on the first electrode.

When the first electrode covers only part of the base substrate, a plurality of original sub-pixels may also be formed at positions without the first electrode.

Optionally, the original sub-pixel comprises red (R) sub-pixel, green (G) sub-pixel, blue (B) sub-pixel and white (W) sub-pixel. Sub-pixels of RGBW four colors are formed by adding a white sub-pixel to sub-pixels of original RGB three primary colors, which may improve utilization of a light source for the display panel, increase display brightness of the display panel, and reduce power consumption of the display panel.

Optionally, the original sub-pixel comprises red (R) sub-pixel, green (G) sub-pixel, blue (B) sub-pixel and yellow (Y) sub-pixel. Sub-pixels of RGBY four colors are formed by adding a yellow sub-pixel to sub-pixels of original RGB three primary colors. The addition of yellow sub-pixel changes shape of the color gamut map from the original triangle (composed of sub-pixels of original RGB three primary colors) into quadrangle (composed of sub-pixels of RGBY four colors) and significantly widen color gamut of color display.

At step 603, amphipathic material layers are formed on at least part of the original sub-pixels.

When no electric field is generated between the first electrode 101 and second electrode 102, each of the amphipathic material layers 109 is hydrophobic, which results in that each conversion sub-pixel 104 covers the original sub-pixel 106, and the display mode of the display panel becomes the conversion sub-pixel mode. When an electric field is generated between the first electrode 101 and second electrode 102, each of the amphipathic material layers 109 becomes hydrophilic, which results in that each conversion sub-pixel 104 shrinks to one side of the original sub-pixel 106, so that the upper water layer 105 covers the original sub-pixel 106, and the display mode of the display panel becomes the original sub-pixel mode. Optionally, the amphipathic material includes an amphipathic polyurethane material or an amphipathic silica nanomaterial.

At step 604, the conversion sub-pixels are formed on the amphipathic material layers respectively.

Here, before step 604, baffles may be formed. The baffles surround the conversion sub-pixels and upper water layers to be formed later. The baffles define the conversion sub-pixels and the upper water layers to be positioned above the original pixels. Preferably, before forming the baffles, a black matrix is formed on the first electrode, and each baffle is provided above the black matrix around the original sub-pixels.

At step 605, an upper water layer is formed on each of the conversion sub-pixels.

At step 606, a second electrode is formed on an opposite substrate.

At step 607, the resulting base substrate and opposite substrate are aligned to form a cell so as to form the display panel.

The display panel manufactured by the manufacturing method provided by this embodiment can switch between the conversion sub-pixel mode and the original sub-pixel mode based on presence or absence of electric field between the first electrode 101 and the second electrode 102. Specifically, when no voltage is applied between the first electrode 101 and the second electrode 102, no electric field is generated between the first electrode 101 and the second electrode 102. At this point, the conversion sub-pixel 104 covers the original sub-pixel 106 from above, and the display mode of the display panel becomes the conversion sub-pixel mode which is the normal state for the display panel. In such conversion sub-pixel mode, when light passes through both the original sub-pixel 106 and the conversion sub-pixel 104, desired light can be generated under the joint action of the original sub-pixel 106 and the conversion sub-pixel 104. When a voltage is applied between the first electrode 101 and the second electrode 102, an electric field is generated between the first electrode 101 and the second electrode 102. At this point, the conversion sub-pixel 104 shrinks to one side of the original sub-pixel 106, so that the upper water layer 105 covers the original sub-pixels 106, and the above display mode of the display panel becomes the original sub-pixel mode. In such original sub-pixel mode, when light passes through only the original sub-pixels 106, desired light can be generated. By switching between the above two display modes, it is possible to improve utilization of a light source for the display panel, reduce power consumption of the display panel, widen color gamut of color display, and further meet requirements of different circumstances on color picture display.

Optionally, the original sub-pixels 106 are white sub-pixels, and the conversion sub-pixels 104 are yellow ink layers. Referring to FIG. 3, when no voltage is applied between the first electrode 101 and the second electrode 102, each of the amphipathic material layers 109 is hydrophobic and each yellow ink layer covers the white sub-pixel from above. At this point, when light passes through both the yellow ink layer and the white sub-pixel along a direction shown by the arrow in FIG. 3, yellow light can be generated. Referring to FIG. 4, when a voltage is applied between the first electrode 101 and the second electrode 102, each of the amphipathic material layers 109 becomes hydrophilic, and each yellow ink layer shrinks to one side of the white sub-pixel, so that the upper water layer 105 covers the white sub-pixel from above. At this point, when light passes through only the white sub-pixel along a direction shown by the arrow in FIG. 4, white light can be generated.

In the manufacturing method of a display panel provided by this embodiment, based on presence or absence of electric field between the first electrode and the second electrode, the display panel switches between the conversion sub-pixel mode and the original sub-pixel mode, so as to improve utilization of a light source for the display panel, reduce power consumption of the display panel, widen color gamut of color display, and further meet requirements of different circumstances on color picture display.

Embodiment 5

This embodiment provides a display device, comprising the display panel according to embodiment 1 or 2. The display device may be any product or component with a display function such as a liquid crystal panel, an electronic paper, an OLED panel, a mobile phone, a tablet computer, a television, a display, a notebook computer, a digital photo frame, a navigator, or the like.

In the display device provided by this embodiment, based on presence or absence of electric field between the first electrode and the second electrode, the display panel switches between the conversion sub-pixel mode and the original sub-pixel mode, so as to improve utilization of a light source for the display panel, reduce power consumption of the display panel, widen color gamut of color display, and further meet requirements of different circumstances on color picture display.

It can be understood that, above implementations are merely exemplary implementations used for explaining the principle of the present invention, but the present invention is not limited thereto. For those skilled in the art, various modifications and improvements may be made without departing from the spirit and essence of the present invention, and these modifications and improvements are deemed as falling within the protection range of the present invention.

The invention claimed is:

1. A display panel, comprising a base substrate and an opposite substrate which are provided oppositely, wherein a first electrode is provided on the base substrate, a second electrode, which is opposite to the first electrode, is provided on the opposite substrate; between the first and second electrodes, there are provided a plurality of original sub-pixels on a side of the first electrode close to the second electrode, the plurality of original sub-pixels are formed as a single-layer structure, conversion sub-pixels allowing light to pass therethrough to change color of the light are provided on a side of at least part of the plurality of original sub-pixels away from the first electrode, and an upper water layer is provided on a side of each of the conversion sub-pixels away from the original sub-pixels;

the conversion sub-pixels are configured to, when an electric field is generated between the first and second electrodes, shrink to one side of the original sub-pixel so that the upper water layer covers the original sub-pixels from above, and, when no electric field is generated between the first and second electrodes, cover the original sub-pixels located under the conversion sub-pixels from above; or the conversion sub-pixels are configured to, when no electric field is generated between the first and second electrodes, shrink to one side of the original sub-pixels so that the upper water layer covers the original sub-pixels from above, and, when an electric field is generated between the first and second electrodes, cover the original sub-pixels located under the conversion sub-pixels from above, wherein, a material of the original sub-pixels includes an amphipathic material, when an electric field is generated between the first and second electrodes, the original sub-pixels are hydrophilic under the action of the electric field, and when no electric field is generated between the first and second electrodes, the original sub-pixels are hydrophobic; or when an electric field is generated between the first and second electrodes, the original sub-pixels are hydrophobic under the action of the electric field, and when no electric field is generated between the first and second electrodes, the original sub-pixels are hydrophilic;

wherein each original sub-pixel is selected from the group including a red sub-pixel, a green sub-pixel and a blue sub-pixel, wherein the display panel further comprises a black matrix around the original sub-pixels, and the black matrix and the original sub-pixels are in a same layer.

2. The display panel according to claim 1, wherein, the display panel further comprises baffles provided to surround the conversion sub-pixels and the upper water layers and used for defining the conversion sub-pixels and the upper water layer to be positioned above the original sub-pixels which are under the conversion sub-pixels.

3. The display panel according to claim 2, wherein, each of the baffles is provided above the black matrix around the original sub-pixels which are under the conversion sub-pixels.

4. The display panel according to claim 1, wherein, the original sub-pixels which are under the conversion sub-pixels are white sub-pixels, and the conversion sub-pixels are yellow ink layers.

5. A display device, comprising the display panel according to claim 1.

6. A display panel, comprising a base substrate and an opposite substrate which are provided oppositely, wherein a first electrode is provided on the base substrate, a second electrode, which is opposite to the first electrode, is provided on the opposite substrate; between the first and second electrodes, there are provided a plurality of original sub-pixels on a side of the first electrode close to the second electrode, the plurality of original sub-pixels are formed as a single-layer structure, conversion sub-pixels allowing light to pass therethrough to change color of the light are provided on a side of at least part of the plurality of original sub-pixels away from the first electrode, and an upper water layer is provided on a side of each of the conversion sub-pixels away from the original sub-pixels;

the conversion sub-pixels are configured to, when an electric field is generated between the first and second electrodes, shrink to one side of the original sub-pixels so that the upper water layer covers the original sub-pixels from above, and, when no electric field is generated between the first and second electrodes, cover the original sub-pixels located under the conversion sub-pixels from above; or the conversion sub-pixels are configured to, when no electric field is generated between the first and second electrodes, shrink to one side of the original sub-pixels so that the upper water layer covers the original sub-pixels from above, and, when an electric field is generated between the first and second electrodes, cover the original sub-pixels located under the conversion sub-pixels from above, wherein, an amphipathic material layer is provided between the original sub-pixels and the conversion sub-pixels, when an electric field is generated between the first and second electrodes, the amphipathic material layer is hydrophilic under the action of the electric field, and when no electric field is generated between the first and second electrodes, the amphipathic material layer is hydrophobic; or when an electric field is generated between the first and second electrodes, the amphipathic material layer is hydrophobic under the action of the electric field, and when no electric field is generated between the first and second electrodes, the amphipathic material layer is hydrophilic;

wherein each original sub-pixel is selected from the group including a red sub-pixel, a green sub-pixel and a blue sub-pixel, wherein the display panel further comprises a black matrix around the original sub-pixels, and the black matrix and the original sub-pixels are in a same layer.

7. A display device, comprising the display panel according to claim 6.

8. A manufacturing method of a display panel, comprising steps of:

forming a first electrode on a base substrate;

forming a plurality of original sub-pixels on a side of the first electrode away from the base substrate, the plurality of original sub-pixels being formed as a single-layer structure, and each original sub-pixel being selected from the group including a red sub-pixel, a green sub-pixel and a blue sub-pixel;

forming conversion sub-pixels, which allow light to pass therethrough to change color of the light, on a side of at least part of the plurality of original sub-pixels away from the first electrode;

forming an upper water layer on a side of each of the conversion sub-pixels away from the original sub-pixels;

forming a second electrode on an opposite substrate; and aligning the resulting base substrate and opposite substrate to form a cell so as to form the display panel, wherein, the conversion sub-pixels are configured to, when an electric field is generated between the first and second electrodes, shrink to one side of the original sub-pixels so that the upper water layer covers the original sub-pixels from above, and, when no electric field is generated between the first and second electrodes, cover the original sub-pixels located under the conversion sub-pixels from above; or the conversion sub-pixels are configured to, when no electric field is generated between the first and second electrodes, shrink to one side of the original sub-pixels so that the upper water layer covers the original sub-pixels from above, and, when an electric field is generated between the first and second electrodes, cover the original sub-pixels located under the conversion sub-pixels from above, wherein, a material of the original sub-pixels includes an amphipathic material, when an electric field is generated between the first and second electrodes, the original sub-pixels are hydrophilic under the action of the electric field, and when no electric field is generated between the first and second electrodes, the original sub-pixels are hydrophobic; or when an electric field is generated between the first and second electrodes, the original sub-pixels are hydrophobic under the action of the electric field, and when no electric field is generated between the first and second electrodes, the original sub-pixels are hydrophilic, wherein the method further comprises forming a black matrix around the original sub-pixels on the first electrode, the black matrix and the original sub-pixels being in a same layer.

9. The manufacturing method of a display panel according to claim 8, wherein, before the step of forming the conversion sub-pixels on a side of at least part of the plurality of original sub-pixels away from the first electrode, the manufacturing method comprises a step of forming baffles surrounding the conversion sub-pixels and the upper water layers and used for defining the conversion sub-pixels and the upper water layer to be positioned above the original sub-pixels which are under the conversion sub-pixel.

10. A manufacturing method of a display panel comprising steps of:

forming a first electrode on a base substrate;

forming a plurality of original sub-pixels on a side of the first electrode away from the base substrate, the plurality of original sub-pixels being formed as a single-layer structure, and each original sub-pixel being selected from the group including a red sub-pixel, a green sub-pixel and a blue sub-pixel;

forming conversion sub-pixels, which allow light to pass therethrough to change color of the light, on a side of at least part of the plurality of original sub-pixels away from the first electrode;

forming an upper water layer on a side of each of the conversion sub-pixels away from the original sub-pixels;

forming a second electrode on an opposite substrate; and aligning the resulting base substrate and opposite substrate to form a cell so as to form the display panel, wherein, the conversion sub-pixels are configured to, when an electric field is generated between the first and second electrodes, shrink to one side of the original sub-pixels so that the upper water layer covers the original sub-pixels from above, and, when no electric field is generated between the first and second electrodes, cover the original sub-pixels located under the conversion sub-pixels from above; or the conversion sub-pixels are configured to, when no electric field is generated between the first and second electrodes, shrink to one side of the original sub-pixels so that the upper water layer covers the original sub-pixels from above, and, when an electric field is generated between the first and second electrodes, cover the original sub-pixels located under the conversion sub-pixels from above, wherein, before the step of forming the conversion sub-pixels on a side of at least part of the plurality of original sub-pixels away from the first electrode, the manufacturing method comprises a step of forming an amphipathic material layer on the side of the at least part of the plurality of original sub-pixels away from the first electrode, wherein, when an electric field is generated between the first and second electrodes, the amphipathic material layer is hydrophilic under the action of the electric field, and when no electric field is generated between the first and second electrodes, the amphipathic material layer is hydrophobic; or, when an electric field is generated between the first and second electrodes, the amphipathic material layer is hydrophobic under the action of the electric field, and when no electric field is generated between the first and second electrodes, the amphipathic material layer is hydrophilic; and the step of forming conversion sub-pixels on a side of at least part of the plurality of original sub-pixels away from the first electrode comprises a step of forming the conversion sub-pixels on a side of the amphipathic material layer away from the original sub-pixels, wherein the method further comprises forming a black matrix around the original sub-pixels on the first electrode, the black matrix and the original sub-pixels being in a same layer.

* * * * *